March 23, 1965     H. R. PADGITT     3,175,037
LENS SYSTEM HAVING ULTRA-WIDE ANGLE OF VIEW
Filed March 18, 1963     2 Sheets-Sheet 1

INVENTOR.
Howard R. Padgitt,
BY
H. H. Losche
Paul S. Collignon Att'ys.

March 23, 1965   H. R. PADGITT   3,175,037
LENS SYSTEM HAVING ULTRA-WIDE ANGLE OF VIEW
Filed March 18, 1963   2 Sheets-Sheet 2

INVENTOR.
Howard R. Padgitt,
BY
W. W. Losche
Paul S. Collignon Att'ys.

3,175,037
LENS SYSTEM HAVING ULTRA-WIDE
ANGLE OF VIEW

Howard R. Padgitt, Park Ridge, Ill., assignor, by mesne assignments, to the United States of America as represented by the Secretary of the Navy
Filed Mar. 18, 1963, Ser. No. 266,116
1 Claim. (Cl. 178—7.85)

The present invention relates to an optical instrument and more particularly to a photographic or television lens system having an ultra-wide angle of view and adaptable for underwater use.

Heretofore, under water exploration by photography or closed-circuit television is generally accomplished by enclosing conventional cameras in water-tight containers with viewing being accomplished through a water-tight window. This method of underwater viewing greatly restricts the performance of the lens system because refraction at the glass window introduces color aberrations and generally reduces the real over-all angular field of view of the system.

In the present invention the lens system is specifically designed for underwater use and takes advantage of the optical refraction at the window by designing it as part of the system. The window is in the form of a meniscus dome with the outer surface being in contact with water and the inner surface being in contact with air thereby forming a weak negative element. After light rays pass through the meniscus dome they pass through an assemblage of lens elements comprised of a very strong negative meniscus element, followed by an undercorrected negative meniscus achromatic element, then a positive meniscus element and then followed by a positive doublet component. A prism-lens of moderate positive power is provided to bend the optical axis 90 degrees so that the system can be utilized with a television camera.

The meniscus dome permits an angular field coverage of 160 degrees. Without this meniscus dome, the refractive index difference across the first surface of the strong negative meniscus is greatly reduced by virtue of being in contact with water and the maximum angular field correspondingly reduced to less than 100 degrees.

It is therefore a general object of the present invention to provide an improved lens system having a wide angle of view.

Another object of the present invention is to provide an improved lens system for use underwater.

Figure 1:
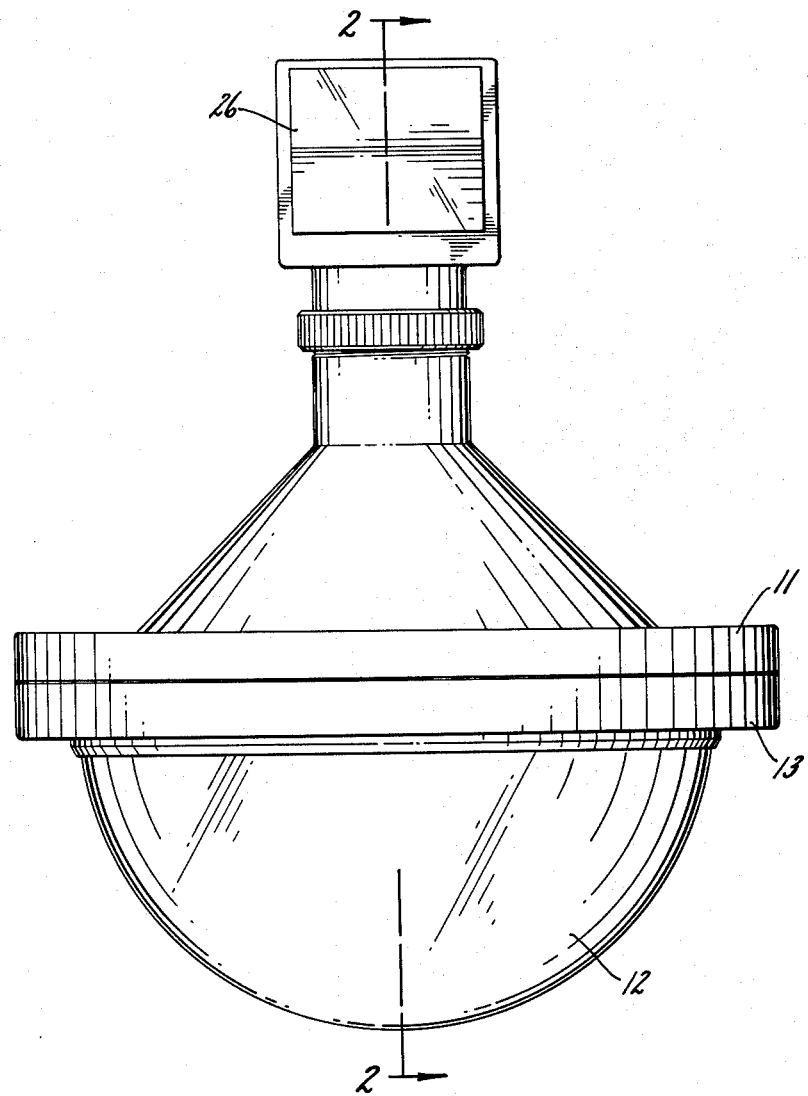
Figure 2:
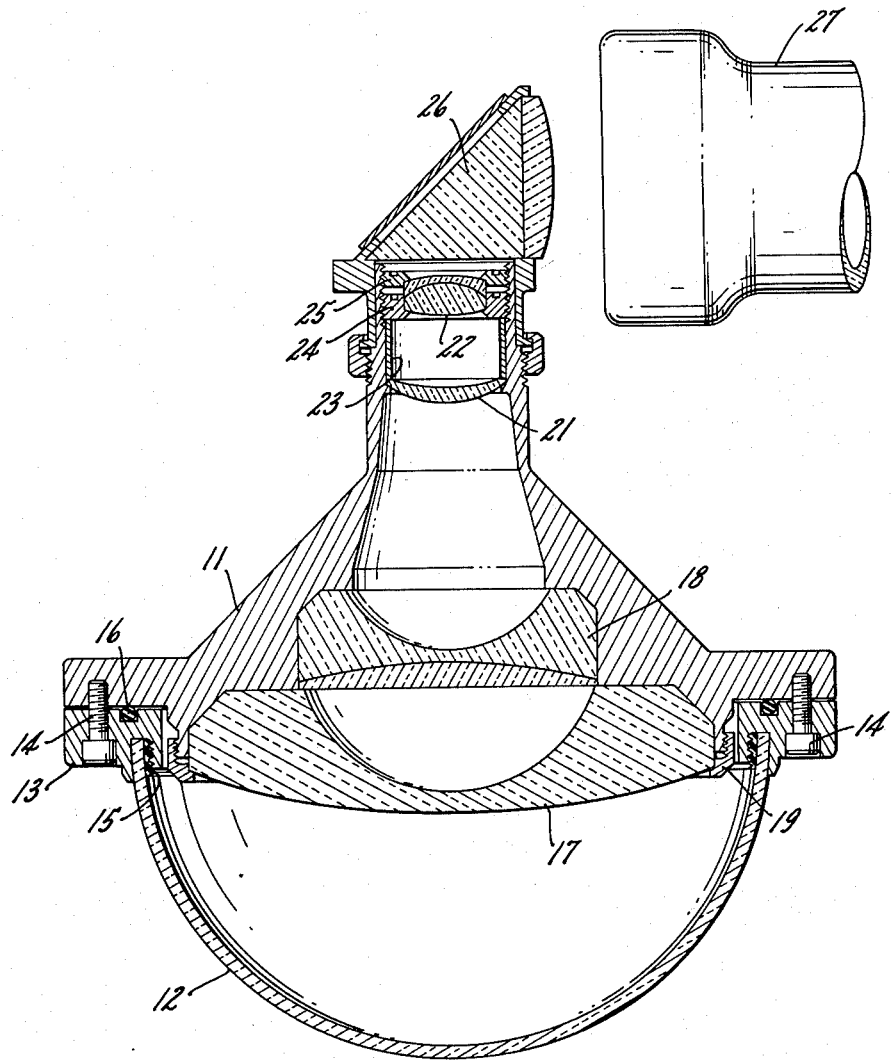

Other objects and advantages of the present invention will be readily appreciated as the same becomes better understood by reference to the following detailed description when considered in connection with the accompanying drawing wherein:

FIGURE 1 is a side elevation view showing a preferred embodiment of the present invention; and FIGURE 2 is a sectional view taken on line 2—2 of FIGURE 1.

Referring now to the drawing, the lens system is mounted in a housing 11 with a meniscus dome 12 being attached to a ring 13 that is threadily attached to housing 11 by means of screws 14. Packing 15 is placed between the meniscus dome 12 and ring 13 to provide a water-tight seal, and an O-ring 16 is is positioned in ring 13 to provide a water-tight seal between ring 13 and housing 11.

A very strong negative meniscus element 17 is positioned in housing 11 and followed by an undercorrected negative meniscus achromatic element 18. Elements 17 and 18 are retained in housing 11 by means of a ring 19 that threadably connects with housing 11. A positive meniscus element 21 and a positive doublet component 22 are provided in the upper end of housing 11 and are retained in position by means of spacer 23 and rings 24 and 25 that threadedly connect with housing 11. A prism-lens 26 of moderate positive power is attached to the upper end of housing 11 and a television image orthicon 27 is positioned adjacent prism-lens 26 and an image is formed thereon. It should be readily understood that a photographic camera could be equally-well positioned adjacent prism-lens 26. Ordinary optical glasses can be used throughout the system.

In operation, the meniscus dome 12 permits maximum angular field coverage, that is about 160 degrees, for without meniscus dome 12 the refractive index difference (or bending power) across the first surface of the strong negative meniscus is greatly reduced by virtue of being in contact with water. Negative lenses 17 and 18 work together to form a virtual image which is "seen" by positive elements 21 and 22.

The prism-lens 26 is not a necessary element of the lens system and can be eliminated if it is not desired to bend the optical axis through some angle. Prism-lens 26 contributes principally overcorrected astigmatism and this can readily be compensated by appropriately bending the forward negative element.

It can thus be seen that the present invention provides an improved lens system for cameras that can be used underwater and that will provide an extremely wide angle of view.

Obviously many modifications and variations of the present invention are possible in the light of the above teachings. It is therefore to be understood, that within the scope of the appended claim, the invention may be practiced otherwise than as specifically described.

What is claimed is:
In a television system for underwater viewing,
a lens housing,
a hemispherical meniscus dome of substantially uniform thickness sealed against one end of said lens housing whereby in operation the outer surface of said meniscus dome contacts water and the inner surface of said meniscus dome contacts air thereby forming a weak negative lens element,
first and second negative meniscus elements mounted in one end of said lens housing adjacent said meniscus dome,
a positive doublet component mounted in the other end of said lens housing,
a positive meniscus mounted in the other end of said lens housing between said positive doublet and one of said negative meniscus elements, and
a television image orthicon adjacent said positive doublet component for receiving an image received through said meniscus dome.

References Cited by the Examiner
UNITED STATES PATENTS

| | | | |
|---|---|---|---|
| 2,947,219 | 8/60 | Van Heel et al. | 88—57 |
| 3,001,462 | 9/61 | D'O Plinter | 95—11 |

FOREIGN PATENTS

| | | |
|---|---|---|
| 756,058 | 8/56 | Great Britain. |

DAVID G. REDINBAUGH, Primary Examiner.
STEPHEN W. CAPELLI, Examiner.